United States Patent [19]

Suzuki et al.

[11] Patent Number: 4,539,643
[45] Date of Patent: Sep. 3, 1985

[54] FUEL CUT-OFF CONTROL SYSTEM IN FUEL INJECTION INTERNAL COMBUSTION ENGINE WITH AUTOMATIC POWER TRANSMISSION

[75] Inventors: Tadashi Suzuki; Yoshiro Morimoto; Hideo Hamada, all of Yokosuka; Masaaki Suga; Takashi Murasugi, both of Yokohama, all of Japan

[73] Assignee: Nissan Motor Company, Limited, Yokohama, Japan

[21] Appl. No.: 420,951

[22] Filed: Sep. 21, 1982

[30] Foreign Application Priority Data

Oct. 1, 1981 [JP] Japan .................................. 56-154755
Oct. 9, 1981 [JP] Japan .................................. 56-160313

[51] Int. Cl.³ ...................... G05D 29/00; F02D 33/00; F02B 75/12
[52] U.S. Cl. ............................... 364/431.09; 74/866; 123/198 DB; 123/325; 364/424.1
[58] Field of Search .................... 364/424.1, 431.09; 74/866; 123/198 DB, 325, 493

[56] References Cited

U.S. PATENT DOCUMENTS

| | | | |
|---|---|---|---|
| 3,736,910 | 6/1973 | Raff | 123/493 |
| 4,257,363 | 3/1981 | Zeller | 123/493 X |
| 4,311,123 | 1/1982 | Gloeckler et al. | 123/325 |
| 4,327,682 | 5/1982 | Harada | 123/493 X |
| 4,350,234 | 9/1982 | Suga et al. | 74/866 X |
| 4,371,050 | 2/1983 | Ikeura | 180/271 |
| 4,387,681 | 6/1983 | Ikeura et al. | 123/325 |
| 4,416,230 | 11/1983 | Katayose et al. | 123/198 DB |
| 4,421,082 | 12/1983 | Katayose et al. | 123/198 DB |
| 4,422,353 | 12/1983 | Suga et al. | 74/866 X |
| 4,437,442 | 3/1984 | Yamaguchi | 123/325 X |
| 4,449,495 | 5/1984 | Fiala | 123/198 DB |
| 4,473,882 | 9/1984 | Suzuki et al. | 364/424.1 |

Primary Examiner—Felix D. Gruber
Attorney, Agent, or Firm—Schwartz, Jeffery, Schwaab, Mack, Blumenthal & Evans

[57] ABSTRACT

A fuel cut-off control can prolong a period of time in which the engine speed is maintained at a range suitable for performing fuel cut-off and shorten a period of time in which the engine speed is in a fuel recovery range to minimize fuel consumption during engine deceleration. In a fuel cut-off control system in a fuel injection internal combustion engine with an automatic transmission, the fuel cut-off control system is responsive to a brake switch signal and an engine speed signal having a value above a fuel recovery threshold to decrease the value of a fuel cut-off threshold to again perform the fuel cut-off even in the normal fuel recovery range. Down shifting of a transmission gear is performed to increase engine speed to a level beyond the fuel cut-off threshold to prolong the fuel cut-off period.

39 Claims, 8 Drawing Figures

FUEL CUT-OFF CONTROL SYSTEM IN FUEL INJECTION INTERNAL COMBUSTION ENGINE WITH AUTOMATIC POWER TRANSMISSION

BACKGROUND OF THE INVENTION

The present invention relates generally to a fuel injection control in a fuel injection internal combustion engine which is associated with an automatic power transmission. More particularly, the invention relates to fuel cut-off control in a fuel injection control system for the purposes of fuel economy and emissions control.

In a fuel injection internal combustion engine, fuel cut-off is performed while the engine is decelerating or coasting in order to save fuel and reduce exhaust emission. On the other hand, even during engine deceleration or coasting, fuel cut-off is inhibitted and fuel injection must be performed under certain engine operating conditions for engine driving stability and prevention of engine stalling. In particular, in the range of relatively low engine speeds, fuel injection must be carried out even while the engine is decelerating or coasting.

For the internal combustion engine equipped with an automatic power transmission, it is difficult to prolong the period in which the fuel cut off is performed to satisfactorily save the fuel. In such an engine, the engine speed can more easily drop into the engine speed range requiring fuel supply than an engine with a manual power transmission, since the automatic power transmission has a torque converter which isolates the engine from a driving wheel shaft to transmit less driving force to the engine than is transmitted to an engine with a manual power transmission. This results in a shorter fuel cut-off period.

Furthermore, in the fuel cut-off control, hysteresis is provided between the fuel recovery engine speed at which fuel supply is resumed in order to prevent the engine from stalling and the fuel cut-off engine speed at which fuel cut-off is performed. Obviously, the fuel cut-off engine speed is higher than the fuel recovery engine speed. Therefore, once the engine speed drops to the fuel recovery engine speed, fuel cut-off cannot be performed until the engine speed reaches the fuel cut-off engine speed again. In an engine with automatic power transmission, the fuel recovery engine speed is preset to a comparably high engine speed in order to satisfactorily prevent the engine from stalling and, for the same reason, the fuel cut-off engine speed is preset to a higher engine speed than that required for engine warm up. As a result, the engine speed during deceleration of coasting can quickly pass the fuel recovery engine speed so that the fuel cut-off period is shortened and the engine speed will return rather slowly to the fuel cut-off engine speed, both of which unnecessarily increase fuel consumption.

On the other hand, it is well known that, with an automatic power transmission, the engine speed can be increased by shifting the transmission gear position to a lower gear during deceleration, similarly to kick-down during acceleration. By using this down-shifting of the transmission gear effectively, the engine speed can quickly reach the fuel cut-off engine speed to perform the fuel cut-off even after the engine speed has dropped to the fuel recovery engine speed. In order to effectively perform the down-shifting of the transmission gear, a down-shifting actuator for operating a down-shifting valve in the automatic power transmission for kick-down operation will be used even during engine deceleration. In this way, the period of time for which the engine speed falls within the fuel recovery range is shortened in order to decrease unnecessary consumption of fuel.

SUMMARY OF THE INVENTION

Therefore, it is an object of the present invention to provide a fuel cut-off control which can prolong the period of time in which the engine speed falls within a range suitable for performing fuel cut-off and which can shorten the period of time in which the engine speed falls within a fuel recovery range in order to minimize fuel consumption during engine deceleration.

To accomplish the above-mentioned and other objects, there is provided a fuel cut-off control system in a fuel injection internal combustion engine with an automatic transmission, in which the fuel cut-off control system is responsive to a brake switch signal and an engine speed signal with a signal value exceeding a fuel recovery threshold to decrease the value of a fuel cut-off threshold to perform fuel cut-off even in the normal fuel recovery range.

Preferably, down-shifting of a transmission gear is performed in order to increase engine speed to a level exceeding the fuel cut-off threshold and thereby prolong the fuel cut-off period.

According to one embodiment of the present invention, the fuel cut-off control system comprises a first sensor for detecting the released position of an accelerator pedal to produce a first signal, a second sensor for detecting the engine revolution speed to produce a second signal having a value indicative of the engine revolution speed, a third sensor for detecting application of a brake to produce a third signal;

a fuel injection system including a fuel injector for controlling the fuel injection quantity and fuel injection timing on the basis of preselected control parameters, a fuel cut-off signal generator for producing a fuel cut-off signal to disable the fuel injection system and thereby cut-off the fuel supply to the engine in response to the first signal, the state of the fuel cut-off signal generator being variable between a first state in which the second signal value is compared to a first lower threshold to resume operation of said fuel injection system and thereby resume fuel supply to the engine when the second signal value becomes less than the first threshold, and a second state in which the second signal value is compared to a second higher threshold to disable said fuel injection system when the second signal value exceeds the second threshold, and means for placing the fuel cut-off signal generator in the first state in response to the third signal.

According to another embodiment, a method for controlling fuel cut-off comprises detecting when a throttle valve is open at an angle smaller than a predetermined open angle to produce a first signal, detecting an engine revolution speed to produce a second signal having a value proportional to the engine revolution speed, detecting application of a brake to produce a third signal, producing a first lower and second higher reference signals respectively having values representative of first lower and second upper thresholds, producing a fuel cut-off signal to cut-off fuel supply in response to said first signal, comparing the second signal value to the first reference signal value when the fuel supply to the engine has been cut off to resume fuel supply when the second signal value becomes less than the first reference signal value, comparing the second signal value to the second reference signal value and cutting off the fuel supply to the engine when the second signal value exceeds the second reference signal value, and cutting off the fuel supply to the engine in response to the third signal.

BRIEF DESCRIPTION OF THE DRAWINGS

The present invention will be understood more fully from the detailed description given herebelow and from the accompanying drawings of the preferred embodiment of the invention, which, however, should not be taken as limitative to the invention but for elucidation and explanation only.

In the drawings.

DESCRIPTION OF THE PREFERRED EMBODIMENT

Figure 1:
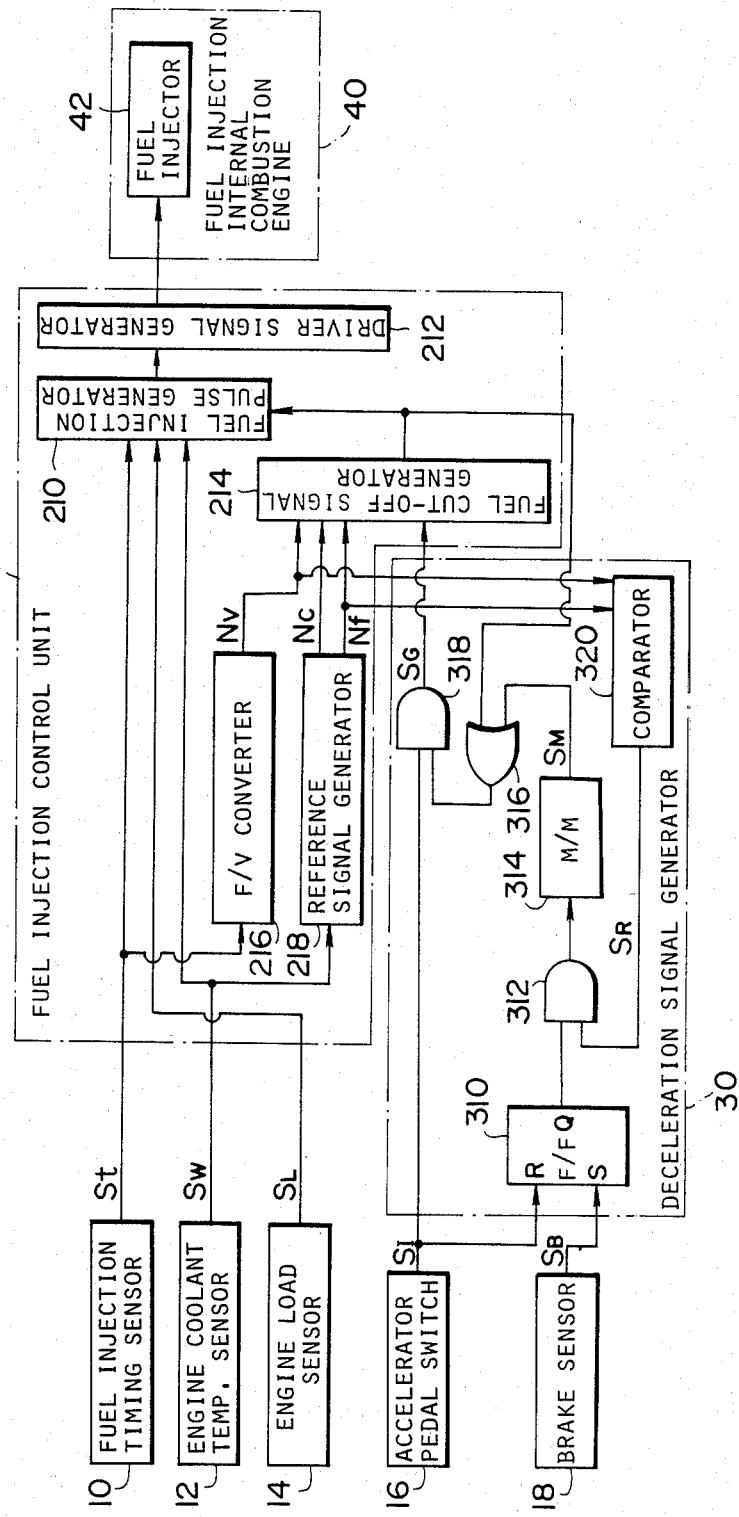
FIG. 1 is a schematic block diagram of the first embodiment of a fuel cut-off control system according to the present invention.

Referring now to the drawings, particularly to FIG. 1, there is illustrated the first embodiment of a fuel cut-off control system according to the present invention. A fuel injection timing sensor 10 comprises a crank angle sensor or ignition timing sensor for detecting engine revolution speed. The fuel injection timing sensor 10 produces a fuel injection timing pulse signal $S_t$ in synchronism with the engine revolution. An engine coolant temperature sensor 12 produces an engine coolant temperature signal $S_w$ having a value proportional to the engine coolant temperature. An engine load sensor 14 comprises a throttle angle sensor or an intake vacuum sensor for detecting the load on the engine. The engine load sensor 14 produces an engine load signal $S_L$ representative of the current engine load condition.

The fuel injection timing sensor 10, the engine coolant temperature sensor 12 and the engine load sensor 14 are connected to a fuel injection pulse generator 210 in a fuel injection control unit 20. The fuel injection pulse generator 210 produces a fuel injection pulse $S_p$ having a pulse width determined on the basis of the fuel injection timing signal $S_t$, the engine coolant temperature signal $S_w$ and the engine load signal $S_L$. The arithmetic operation in the fuel injection pulse generator 210 is per se well known and can be performed in various ways. For example the U.S. Pat. No. 4,319,327 to Kazuhiro HIGASHIYAMA et al, issued on Mar. 9, 1982 discloses a Load Dependent Fuel Injection Control System for a fuel-injection internal combustion engine. In the disclosed system, basic fuel injection rate signals are produced in accordance with the load on the engine and the engine output speed and are modified by a correction value read out from a collection of data representing various correction values in terms of the engine output speed and the engine load. When the correction value selected is zero or smaller than a predetermined value, the fuel injection rate may be feedback controlled to achieve a predetermined air/fuel mixture ratio in the engine through detection of the air/fuel ratio of the mixture produced in the engine. In addition, the U.S. Pat. No. 4,313,412 to Akio HOSAKA et al, issued on Feb. 2, 1982 discloses a fuel supply control system using a stored program-type digital computer for calculating a basic fuel injection amount and correcting the basic fuel amount in accordance with various correction factors. The correction factors include an engine coolant temperature as one of the factors used to correct the basic fuel amount.

The disclosure in the above-mentioned U.S. Patents are herewith incorporated by reference.

On the other hand, general fuel cut-off operation in the fuel injection control has been illustrated in the U.S. Pat. No. 4,371,050. In this patent, there is disclosed a Fuel Cut-Off Apparatus responsive to various vehicle operating conditions for cutting off the flow of fuel from a fuel supply system to the engine. The fuel cut-off control apparatus is adapted to interrupt the fuel flow when the throttle valve is in its fully closed position, the engine speed is above a first engine speed reference level and the vehicle speed is above a first vehicle speed reference level. The fuel cut-off control apparatus is adapted to permit fuel flow to the engine when the throttle valve is in its open position, the engine speed is below a second engine speed reference level lower than the first engine speed reference level, or the vehicle speed is below a second vehicle speed reference level lower than the first vehicle speed reference level. The disclosure of U.S. Pat. No. 4,371,050 is also incorporated by reference.

Returning to FIG. 1, the fuel injection timing sensor 10 is also connected to a fuel cut-off signal generator 214 via a frequency/voltage converter 216. As set forth previously, since the fuel injection timing signal $S_t$ is produced in syncronism with the engine revolution and thus the frequency thereof is proportional to the engine revolution speed, the output voltage $N_V$ of the frequency/voltage converter 216 is representative of the engine speed. Therefore, the fuel cut-off signal generator 214 receives the frequency/voltage converter output $N_V$ as an engine speed parameter signal. The engine coolant temperature sensor 12 is connected to a reference signal generator 218 to transmit the engine coolant temperature signal $S_w$ to the latter. The reference signal generator 218 produces a fuel recovery reference signal $N_f$ representative of a fuel recovery threshold engine speed and a fuel cut-off reference signal $N_c$ representative of a fuel cut-off threshold engine speed. The values of the fuel recovery reference signal $N_f$ and the fuel cut-off reference signal $N_c$ are variable depending upon the engine coolant temperature signal value.

The fuel cut-off signal generator 214 is also connected to a deceleration signal generator 30. The deceleration signal generator 30, in turn, receives an input from an accelerator pedal switch 16 which is turned ON to produce a HIGH level accelerator signal $S_f$ indicative of the engine deceleration or coasting while an accelerator pedal (not shown) is released. Also, the deceleration signal generator 30 is connected to a brake sensor 18 which comprises a brake fluid pressure sensor or a brake pedal switch, for example. The brake sensor 18 is adapted to produce a HIGH level brake signal $S_B$ while the brake (not shown) is applied.

The accelerator pedal switch 16 is connected to a RESET input terminal R of a flip-flop 310 in the deceleration signal generator 30. The brake sensor 18 is connected to a SET input terminal S of the flip-flop 310, to input the brake signal $S_B$ thereto. The flip-flop 310 is responsive to the HIGH level brake signal $S_B$ to change to the SET state in which a HIGH level flip-flop signal is outputted from its Q-output terminal. On the other hand, the flip-flop 310 is responsive to a LOW-level accelerator signal $S_I$ to change to the RESET state in which a LOW level flip-flop signal is outputted. The Q-output terminal of the flip-flop 310 is connected to one of the input terminals of an AND gate 312. The other input terminal of the AND gate 312 is connected to a comparator 320 to receive a comparator signal $S_p$ therefrom. The comparator 320 is also connected to the reference signal generator 218 and the frequency/voltage converter 216. The comparator 320 thus receives the fuel recovery reference signal $N_f$ from the reference signal generator 218 and the frequency/voltage converter output $N_V$. The comparator 320 compares the input signal values and produces a HIGH level comparator signal $S_R$ when the frequency/voltage converter output $N_V$ is larger than the fuel recovery reference signal $N_f$.

The AND gate 312 is connected to a monostable multivibrator 314 to feed a HIGH level gate signal to the latter when the flip-flop 310 is in the SET state and the comparator signal $S_R$ is HIGH. The monostable multivibrator 314 is responsive to the rising edge of the HIGH level gate signal from the AND gate 312 to be triggered. The monostable multivibrator 314 normally feeds a HIGH level signal $S_M$ to one of the input terminals of an OR gate 316 and a LOW level signal for a given period in response to the rising edge of the HIGH-level gate signal. The other input terminal of the OR gate 316 is connected to the output terminal of the fuel cut-off signal generator 214 to receive a fuel cut-off signal $S_c$. Therefore, the OR gate 316 is rendered conductive in response to either the signal $S_M$ of the monostable multivibrator 314 or the fuel cut-off signal $S_c$. The OR gate 316 is connected to one of the input terminals of an AND gate 318. The other input terminal of the AND gate 318 is connected to the foregoing accelerator pedal switch 16 to receive the accelerator signal $S_I$.

The AND gate 318 is, in turn, connected to the fuel cut-off signal generator 214 to output a deceleration signal $S_G$ thereto when the AND condition of the accelerator signal $S_I$ and the output of the OR gate 316 is established. The fuel cut-off signal generator 214 is responsive to the deceleration signal $S_G$ to compare the frequency/voltage converter output $N_V$ with the fuel recovery reference signal $N_f$. As long as the frequency/voltage converter output $N_V$ is larger than the fuel recovery reference signal, the fuel cut-off signal generator 214 outputs the fuel cut-off signal $S_c$ to the fuel injection pulse generator 210. The fuel injection pulse generator 210 is disabled by the fuel cut-off signal $S_c$ to stop outputting the fuel injection pulse $S_p$ to a fuel injector 42 of a fuel injection internal combustion engine 40 via a driver signal generator 212. When the frequency/voltage converter output $N_V$ becomes equal to or smaller than the fuel recovery reference signal $N_f$, the fuel cut-off signal $S_c$ is terminated and, thus, the fuel injection pulse generator 210 starts outputting the fuel injection pulse $S_p$ to the fuel injector 42 via the driver signal generator 212.

At the same time, the fuel cut-off signal generator 214 switches the reference signal to be compared with the frequency/voltage converter output $N_V$ from the fuel recovery reference signal $N_f$ to the fuel cut-off reference signal $N_c$.

It should be appreciated that in the reference signal generator 218, the fuel recovery reference signal $N_f$ and the fuel cut-off reference signal $N_c$ are adjusted in accordance with the engine coolant temperature signal $S_w$. It should also be obvious that the fuel cut-off reference signal $N_c$ has a value larger than that of the fuel recovery reference signal $N_f$, since the fuel cut-off engine speed is higher than the fuel recovery engine speed.

In operation, as long as the accelerator pedal is depressed and thus the throttle valve is opened, the accelerator pedal switch 16 is kept OFF and outputs a LOW-level accelerator signal $S_I$. In this case, the AND gate 318 is closed to disable the fuel cut-off signal generator 214. The fuel injection pulse generator 210 calculates the fuel injection pulse width so as to set the duty cycle, i.e., the ratio of energized period and deenergized period, thereof on the basis of the fuel injection timing signal $S_t$, the engine coolant temperature signal $S_w$ and the engine load signal $S_L$. As will be appreciated, the calculation of the fuel injection pulse width in the fuel injection pulse generator is performed in synchronism with the fuel injection timing signal. The fuel injection pulse $S_p$ is outputted to the driver signal generator 212 to drive the fuel injector 42 to perform fuel injection at the controlled amount.

If the accelerator pedal is released for deceleration or coasting, the accelerator switch 16 is turned ON to output a HIGH-level accelerator signal $S_I$. The HIGH-level accelerator signal $S_I$ is fed to the AND gate 318 and the RESET input terminal R of the flip-flop 310. The flip-flop 310 is thus reset to output the LOW-level flip-flop signal from the Q-output terminal. The comparator 320 produces the HIGH level comparator signal $S_R$ as long as the frequency/voltage converter output $N_V$ is larger than the fuel recovery reference signal $N_f$. Therefore, the output of the AND gate 312 remains LOW as long as the flip-flop 310 is RESET. The LOW level AND-gate output is applied to the monostable multivibrator to hold the output $S_M$ thereof HIGH. The HIGH-level output $S_M$ is fed to the AND gate 318 via the OR gate 316 to open the AND gate.

In this case, the AND gate 318 outputs the HIGH-level deceleration signal $S_G$ to the fuel cut-off signal generator 214. The fuel cut-off signal 214 is responsive to the HIGH-level deceleration signal $S_G$ to produce the fuel cut-off signal $S_c$ as long as the frequency/voltage converter output $N_V$ is larger than the fuel recovery reference signal $N_f$. In other words, the fuel cut-off signal generator 214 generates the fuel cut-off signal when the engine speed is above the fuel recovery engine speed during deceleration and coasting.

When the engine speed decreases to the fuel recovery engine speed, the fuel cut-off signal generator 214 stops outputting the fuel cut-off signal $S_c$ to enable the fuel injection pulse generator 210 to produce the fuel injection pulse. At the same time, the fuel cut-off signal generator 214 switches the reference signal to be compared with the frequency/voltage converter output $N_V$ from the fuel recovery reference signal $N_f$ to the fuel cut-off reference signal $N_c$. Thereafter, the fuel cut-off signal generator 214 compares the frequency/voltage converter output $N_V$ with the fuel cut-off reference signal $N_c$ until the engine speed increases to greater than the fuel cut-off engine speed. In this case, the fuel injection pulse generator 210 generates the fuel injection pulse $S_p$ synchronously with the fuel injection timing signal and with a pulsewidth dependent upon the frequency of the fuel injection timing signal, the engine coolant temperature signal and the engine load signal.

Here, if the brake pedal is depressed to produce a HIGH level brake signal $S_B$, the flip-flop 310 changes to the SET state to produce a HIGH-level flip-flop signal to be applied to the AND gate 312. In this case, if the engine speed represented by the frequency/voltage converter 216 is equal to or below the fuel recovery engine speed, the comparator 320 produces a LOW-level comparator signal $S_R$ to close the AND gate 312. Therefore, the monostable multivibrator continues to output the HIGH-level signal $S_M$, whereby the HIGH-level deceleration signal $S_G$ is outputted to the fuel cut-off signal generator 214 via the AND gate 318. Alternatively, if the frequency/voltage converter output $N_V$ is greater than the fuel recovery reference signal $N_f$, the AND gate 318 is opened by the brake signal $S_B$, whereby a LOW-level signal $S_M$ is outputted by the monostable multivibrator 314 for the given period of time in response to the rising edge of the HIGH-level AND-gate output.

In this case, since the engine speed is maintained in the fuel recovery range, the fuel cut-off signal $S_c$ to be applied to the OR gate 316 remains LOW. Therefore, in response to the change of the signal $S_M$ to LOW level from HIGH level, the output of the OR gate 316 goes LOW to violate the AND condition in the AND gate 318 and thereby close the latter. The AND gate 318 outputs a LOW-level deceleration signal $S_G$ to the fuel cut-off signal generator 214 as if the accelerator pedal switch 16 had been turned off by depressing the accelerator pedal. The fuel cut-off signal generator 214 is responsive to the LOW-level gate signal $S_G$ to switch the reference signal from the fuel cut-off reference signal $N_c$ to the fuel recovery reference signal $N_f$. Thus, after termination of the given output period of the monostable multivibrator, the fuel cut-off signal generator 214 compares the frequency/voltage converter output $N_V$ with the fuel recovery reference signal $N_f$ to produce the HIGH-level fuel cut-off signal $S_c$ as long as the engine speed is above the fuel recovery engine speed.

Thus, according to the present invention, the fuel cut-off can be performed even when the engine speed is maintained in the fuel recovery range due to application of the brake. Thus, the period for effecting fuel cut-off is prolonged to effectively save fuel.

It should be appreciated that, even though the fuel cut-off is performed while the engine speed is in the fuel recovery range due to application of the brake, the engine will not stall since it is being driven by engine braking while coasting. Furthermore, by feeding back the fuel cut-off signal to the OR gate to keep the output thereof HIGH as long as the fuel cut-off signal remains HIGH level, to prevent the fuel cut-off signal generator from being disabled to output the HIGH-level fuel cut-off signal by application of the brake.

Figure 2:
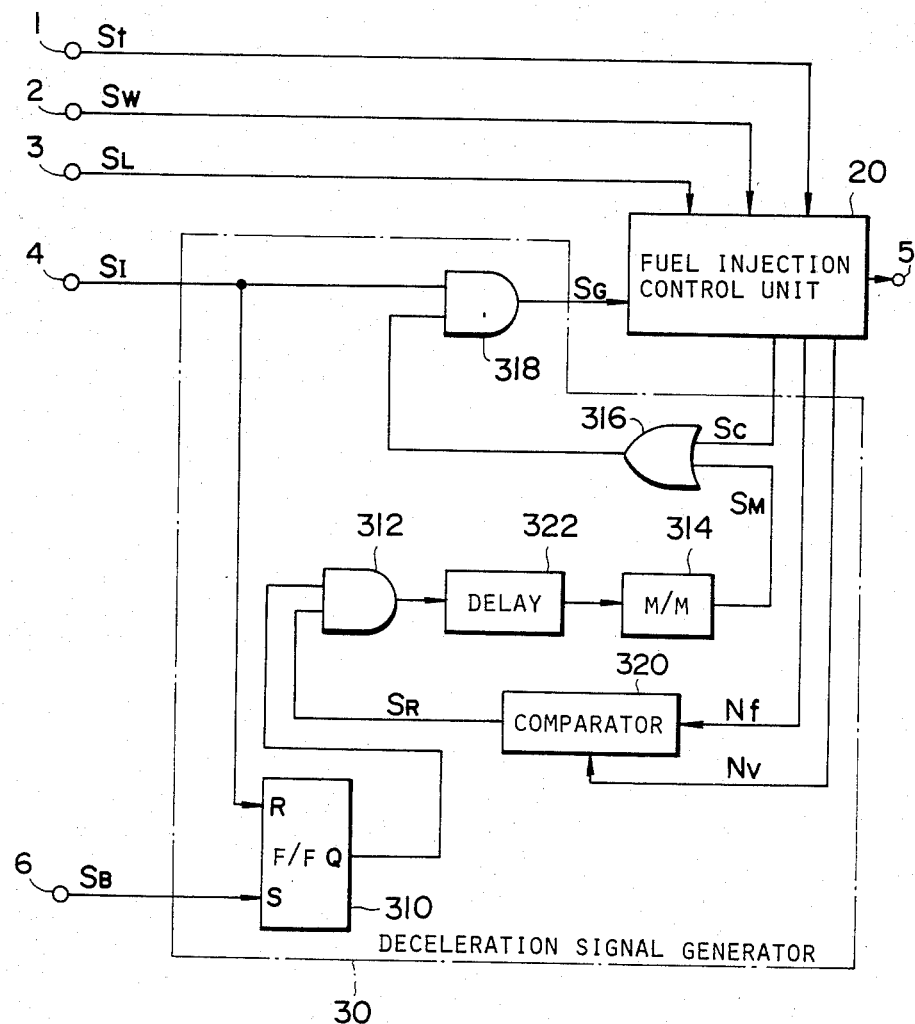
FIG. 2 is a schematic block diagram of the second embodiment of the fuel cut-off control system.

The foregoing first embodiment can be modified to omit the flip-flop 310 by directly connecting the brake sensor 18 to the AND gate 312. The first embodiment can be modified in any way as long as the foregoing functions can be performed. One of the modifications is illustrated in FIG. 2 as the second embodiment. In FIG. 2, a delay circuit 322 is inserted between the AND gate 312 and the monostable multivibrator 314. The delay circuit 322 is adapted to directly conduct LOW-level signals without delay and to enforce a given delay on HIGH-level signals. Other circuitry is the same as the foregoing first embodiment.

In this embodiment, as long as the engine speed remains above the fuel recovery engine speed after releasing the accelerator pedal, the system will work identically as illustrated in FIG. 1. Once the engine speed decreases to the fuel recovery engine speed to stop fuel cut-off signal. The HIGH-level output of the AND gate 312 is applied to the monostable multivibrator 314 via the delay circuit 322 after the given delay time. Thus, switching of the gate signal $S_G$ of the AND gate 318 from HIGH level to LOW level is delayed for the given delay time and thus switching of the reference signals from the fuel cut-off reference signal $N_c$ to the fuel recovery reference signal is delayed for the given delay time.

Figure 3:
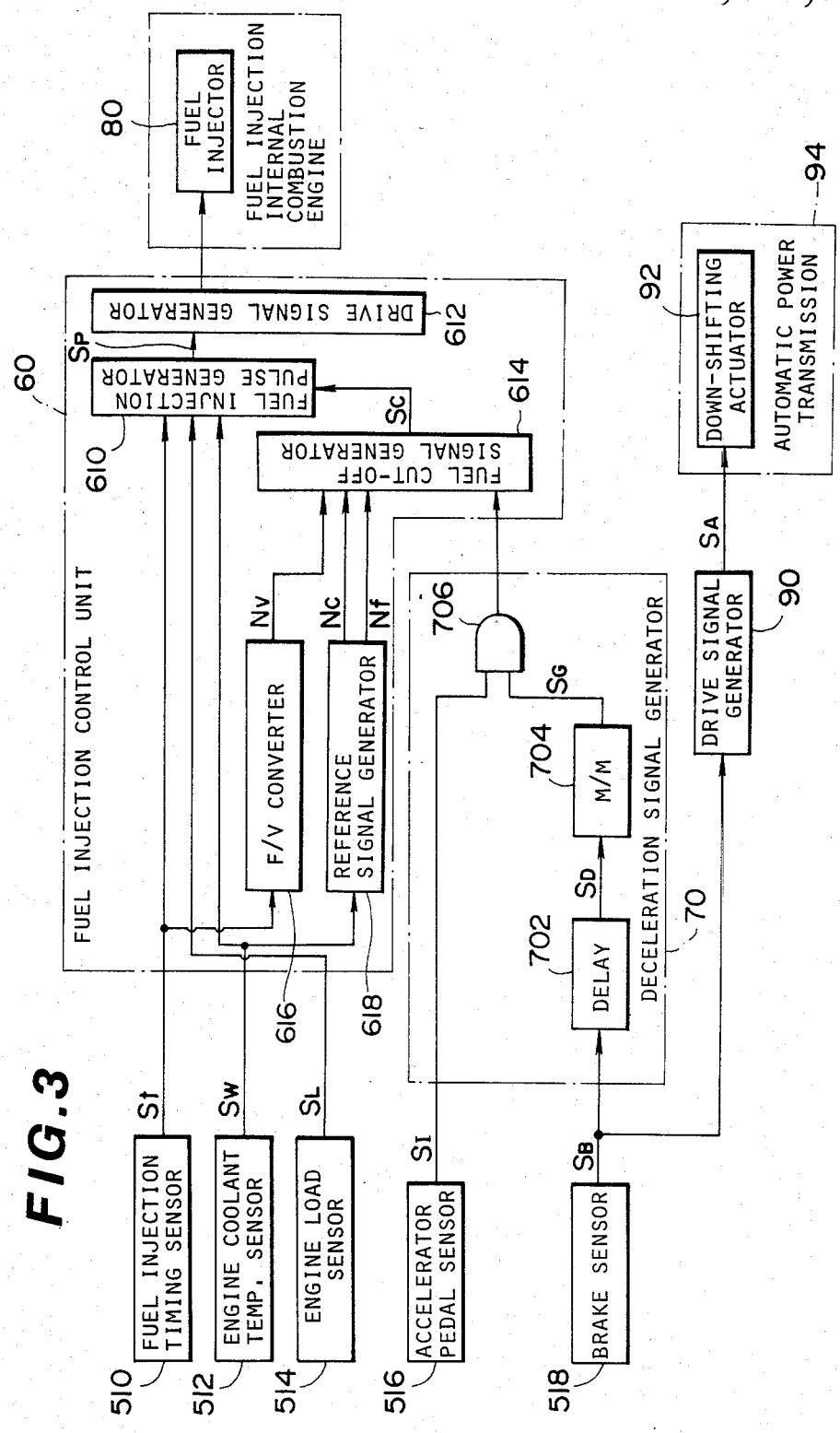
FIG. 3 is a schematic block diagram of the third embodiment of the fuel cut-off control system.

Referring to FIG. 3, there is illustrated the third embodiment of the fuel cut-off control system according to the present invention.

As in the foregoing first embodiment, the fuel injection timing sensor 510, the engine coolant temperature sensor 512 and the engine load sensor 514 are connected to a fuel injection pulse generator 610 in a fuel injection control unit 60. The fuel injection pulse generator 610 produces a fuel injection pulse $S_p$ having a pulse width determined on the basis of the fuel injection timing signal $S_t$, the engine coolant temperature signal $S_w$ and the engine load signal $S_L$.

On the other hand, the fuel injection timing sensor 510 is connected a fuel cut-off signal generator 614 via a frequency/voltage converter 616. As set forth, since the fuel injection timing signal $S_t$ is produced in synchronism with the engine revolution and thus the frequency thereof is proportional to the engine revolution speed, the output voltage $N_V$ of the frequency/voltage converter 616 is representative of the engine speed. Therefore, the fuel cut-off signal generator 614 receives the frequency/voltage converter output $N_V$ as an engine speed parameter signal. The engine coolant temperature sensor 512 is connected to a reference signal generator 618 to transmit the engine coolant temperature signal $S_w$ to the latter. The reference signal generator 618 produces a fuel recovery reference signal $N_f$ representative of a fuel recovery threshold engine speed and a fuel cut-off reference signal $N_c$ representative of a fuel cut-off threshold engine speed. The values of the fuel recovery reference signal $N_f$ and the fuel cut-off reference signal $N_c$ are adjusted in accordance with the engine coolant temperature signal value.

The fuel cut-off signal generator 614 is further connected to a deceleration signal generator 70. The deceleration signal generator 70 is, in turn, connected to an accelerator pedal switch 516 which is turned ON to produce a HIGH-level accelerator signal $S_I$ indicative of engine deceleration or coasting while an accelerator pedal (not shown) is released, as set forth previously. Also, the deceleration signal generator 70 is connected to a brake sensor 518 which comprises a brake fluid pressure sensor or a brake pedal switch, for example. The brake sensor 18 is adapted to produce a HIGH-level brake signal $S_B$ as long as a brake (not shown) is applied.

As shown in FIG. 3, the deceleration signal generator 70 comprises a delay circuit 702, a monostable multivibrator 704 and an AND gate 706. Similarly to the foregoing first embodiment, the monostable multivibrator 704 is adapted to normally output the HIGH-level signal $S_M$ and to output the LOW-level signal in response to the rising edge of the input from the delay circuit 702. The monostable multivibrator 704 outputs the LOW-level signal $S_M$ for a given period of time and the given period terminates, resets to output the HIGH level signal. One of the input terminals of the AND gate 706 is connected to the accelerator pedal signal 516 to receive the HIGH-level accelerator signal $S_I$ while the accelerator pedal is released and thus the throttle valve is fully closed. Therefore, as long as the monostable multivibrator 704 continues to output the HIGH level signal $S_M$, the AND gate 706 is opened to perform the fuel cut-off if the engine speed represented by the frequency/voltage converter signal value $N_v$ is greater than the fuel recovery reference signal value $N_f$ from the reference signal generator 608.

As set forth with respect to the foregoing first embodiment, the fuel cut-off signal generator 614 responds to engine speed equal to or less than the fuel recovery engine speed to turn the fuel cut-off signal level from HIGH level to LOW level to resume fuel injection. At the same time, the reference signal to be compared to the frequency/voltage converter output $N_v$ is switched from the fuel recovery reference signal $N_f$ to the fuel cut-off signal $N_c$. The fuel cut-off signal generator 614 carries out the fuel cut off operation again when resumption of the fuel injection caused the engine speed to accelerate to a level exceeding the fuel cut-off engine speed, as set forth previously. At this time, the reference signal is again switched from the fuel cut-off reference signal to the fuel recovery reference signal.

As in the foregoing first embodiment, the fuel cut-off signal generator 614 is responsive to the LOW level signal $S_G$ which is produced after the brake pedal is depressed, and thus the brake sensor 518 produces the brake signal $S_B$, given the condition that the engine speed is above the fuel recovery engine speed.

In this embodiment, the monostable multivibrator 704 changes its output signal level from HIGH level to LOW level at a specific time after the application of brake as determined by the delay circuit 702.

In addition, the brake sensor 518 is connected to a drive signal generator 90. The drive signal generator 90 is, in turn, connected to the down-shifting actuator 92 of an automatic power transmission 94. The drive signal generator 90 produces a drive signal $S_A$ in response to the HIGH-level brake signal $S_B$. The drive signal $S_A$ is outputted to the down-shifting actuator 92 to activate the latter to shift the transmission into the adjacent lower gear.

The down-shifting actuator 92 may comprise a kick-down actuator in the automatic power transmission. Such a kick-down actuator is normally responsive to an acceleration signal produced by an accelerator switch installed near an accelerator pedal and responsive to depression of the accelerator pedal beyond a predetermined position. U.S. Pat. No. 3,495,481 to Koichi OHIE et al, issued on Feb. 17, 1970 discloses an Automatic Speed Change Gear Control Device for Use in an Automobile. In this device, a solenoid down-shifting valve has been disclosed. As set forth therein, the solenoid down-shifting valve is operable by a switch sensitive to depression of the accelerator pedal. U.S. Pat. No. 3,587,353 to Tetsuya IIJIMA, issued on June 28, 1971 also discloses a Hydraulic Control System for an Automatic Transmission Mechanism with a kickdown valve operated by a solenoid responsive to a signal produced when the accelerator pedal is depressed beyond the predetermined magnitude. The disclosures of the above-mentioned United States Patents are incorporated by reference.

In the shown embodiment, the drive signal generator 90 may be connected the down-shifting actuator for electromagnetically operating the kickdown valve via an OR gate or an appropriate gate circuit to which the accelerator pedal switch will be also connected.

The operation of the fuel cut-off control system in FIG. 3 will be explained herebelow with reference to the timing chart of FIG. 4.

Assuming the accelerator pedal is released at a time $t_1$ in order to decelerate or coast, the accelerator pedal switch 510 is turned ON to produce the HIGH level accelerator signal $S_I$. Thereafter, at a time $t_2$, the brake is applied for further deceleration or for down-shifting the automatic power transmission to the adjacent lower gear, and simultaneously the brake sensor 518 outputs the HIGH level brake signal $S_B$ in response thereto. The drive signal generator 90 is responsive to the brake signal $S_B$ to produce the drive signal $S_A$ which energizes the down-shifting actuator 92 of the automatic power transmission 94. As a result, the down-shifting valve is operated to forcingly shift the transmission into the adjacent lower gear.

On the other hand, at the time $t_1$, the accelerator signal $S_I$ is fed to the AND gate 706. Since the monostable multivibrator 704 outputs the HIGH level signal $S_M$ in the absence of the brake signal $S_B$, the AND gate 706 opens in response to the accelerator signal $S_I$. The fuel cut-off signal generator 614 is responsive to the multivibrator signal $S_G$ to feed the fuel cut-off signal $S_C$ to the fuel injection pulse generator 610 in order to disable the latter, at the time $t_1$. At a time $t_3$ which is a period of delay time $t_a$ after application of the brake at time $t_2$, the brake signal $S_B$ is applied to the monostable multivibrator 704 to change its output level from HIGH to LOW for the given period $t_b$. In response to the LOW-level signal $S_M$, the AND gate 706 is closed to feed the LOW-level signal $S_G$ to the fuel cut-off signal generator 614, at time $t_3$. Since the AND gate 706 remains closed for the period $t_b$ determined by the monostable multivibrator, the fuel cut-off signal generator 614 ceases to output the fuel cut-off signal $S_c$ for the period $t_b$. At a time $t_4$ at the end of the period $t_b$, the signal $S_M$ returns to the HIGH level to open the AND gate 706. The fuel cut-off signal generator 614 is responsive to the HIGH level signal $S_G$ to resume output of the fuel cut-off signal $S_c$.

The fuel cut-off signal generator 614 compares the frequency/voltage converter output $N_v$ with the fuel recovery reference signal $S_f$ in response to the accelerator signal $S_I$ as long as the frequency/voltage converter output value $N_v$ is greater than the fuel recovery reference signal value $N_f$. If the frequency/voltage converter output $N_v$ becomes equal to or less than the fuel recovery reference signal $N_f$, the fuel cut-off signal generator 614 ceases to output the HIGH-level fuel cut-off signal $S_c$ in order to allow fuel injection. In response to cessation of the fuel cut-off, the fuel cut-off signal generator 614 switches the reference signal from the fuel recovery reference signal $N_f$ to the fuel cut-off reference signal $N_c$ as long as the frequency/voltage converter output value $N_v$ remains lower than the fuel cut-off reference signal $N_c$.

When the brake is applied at a time $t_2$ and therefor the AND gate is closed for the period $t_b$ starting at a time $t_3$ after delay time $t_a$ from the time $t_2$, the fuel cut-off signal generator switches the reference signal to be compared to the frequency/voltage converter output $N_v$ from the fuel cut-off reference signal $N_c$ to the fuel recovery reference signal $N_f$, as set forth with respect to the foregoing first embodiment.

With respect to the downshifting operation in the automatic power transmission, incorporation of the disclosure is made for the disclosure of European Patent Publication No. 0,045,962, published on Feb. 17, 1982 by reference thereto now U.S. Pat. No. 4,371,050 in the patent, there is disclosed a Control Method and System for Automatic Transmission in which the automatic power transmission gear position is changed from one position to the adjacent lower gear position by the kick-down solenoid valve in response to depression of the brake pedal.

It will be appreciated that, for fuel cut-off control for the fuel injection internal combustion engine equipped with an automatic power transmission, the fuel recovery threshold for resuming fuel supply will be set to an engine speed of about 1,250 r.p.m. for normal engine operating conditions. If the engine speed drops below 1,000 r.p.m., the engine may stall even if the fuel supply is resumed. Alternatively, the fuel cut-off threshold for normal engine operating condition will be set to an engine speed of about 2,200 r.p.m. Therefore, when the vehicle is coasting or performing engine braking, the engine speed drops to the fuel recovery threshold with the fuel cut-off and then increases to the fuel cut-off threshold again after resumption of the fuel supply, when the engine speed has dropped below the fuel recovery threshold.

Figure 4:
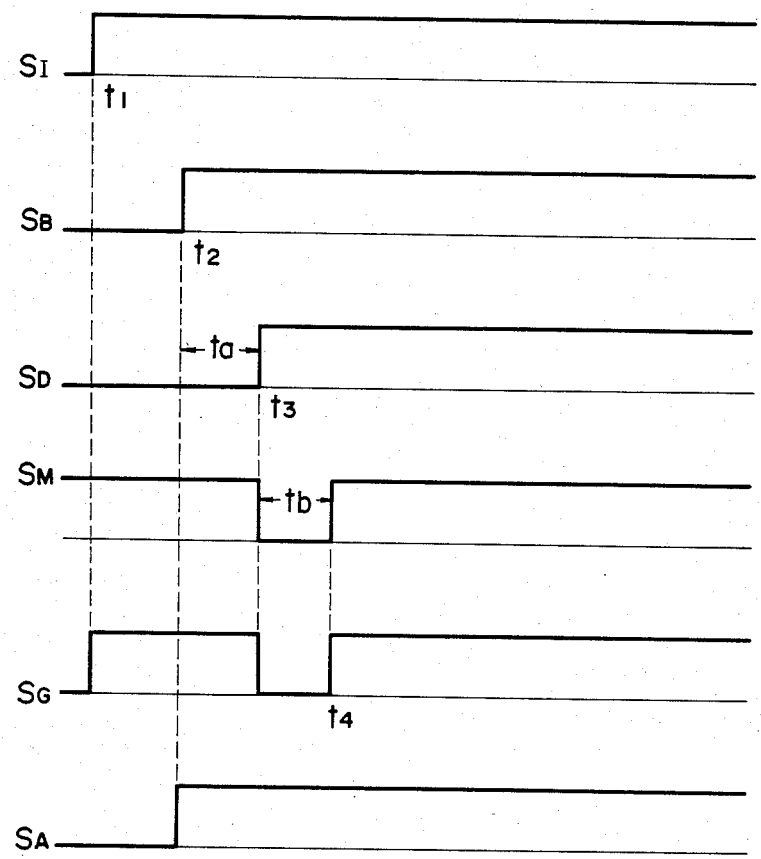
FIG. 4 is a timing chart of the operation of the fuel cut-off control system of FIG. 5.

Assuming the engine speed at the time $t_2$ of the timing chart of FIG. 4 is in the range between the fuel cut-off threshold and the fuel recovery threshold after having dropped to the fuel recovery threshold to re-initiate fuel supply, the engine speed increases due to resumption of the fuel supply to the fuel cut-off threshold. In this case, the fuel cut-off signal generator compares the engine speed with the fuel cut-off engine speed, e.g., 2,200 r.p.m. In response to application of brake at the time $t_2$, the transmission gear is shifted into a lower gear ratio to increase the engine speed after a response delay in the transmission hydraulic circuit approximately corresponding to the delay time $t_a$. Under these engine conditions, the fuel cut-off can be performed to converse fuel without danger of engine stalling. Therefore, in response to application of the brake, the fuel supply is again cut-off until the engine speed drops to the fuel recovery threshold.

It should be noted that although the down-shifting of the transmission gear has been described only to the adjacent lower gear position, it would be possible to carry out down-shifting to the further lower gear position depending on the engine speed. Furthermore, it should be noted that the delay time provided by the delay circuit 702 is intended to match the lag time of the down-shifting operation of the automatic transmission due to response lag in the hydraulic circuit. In this regard, the delay time can be adjusted depending on the engine speed at the application of the brake, since the lag time may vary depending on the engine speed.

As described hereabove, according to the shown second embodiment, after the accelerator pedal is released, the engine speed can be increased by down-shifting the automatic transmission gear position in response to the application of the brake. In this way, the engine speed will remain above the fuel recovery threshold for longer than in the conventional fuel cut-off control to prolong the period during which fuel is cut off in order to improve fuel economy.

Figure 5:
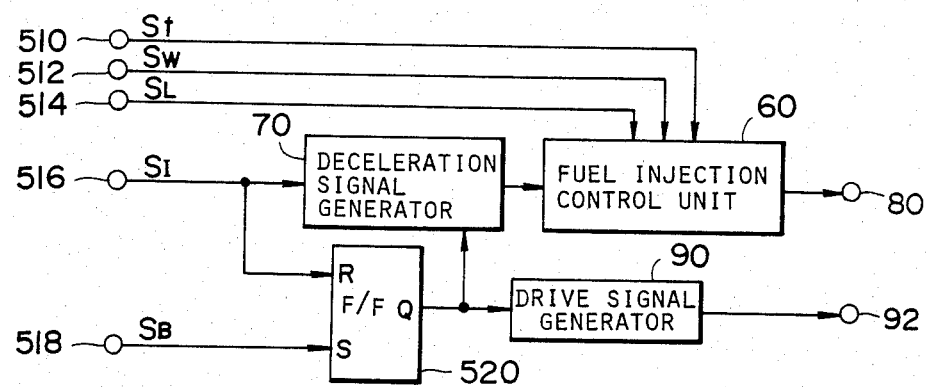
FIG. 5 is a schematic block diagram of the fourth embodiment of the fuel cut-off control system.

FIGS. 5 to 8 respectively show modifications of the foregoing second embodiment of the fuel cut-off control system according to the present invention. In FIG. 5, the brake sensor 518 is connected to a SET input terminal S of a flip-flop 520. A RESET input terminal R of the flip-flop 520 is connected to the accelerator pedal sensor 516. The Q-output terminal of the flip-flop 520 is, in turn, connected to the drive signal generator 90.

The flip-flop 520 is adapted to be set in response to the rising edge of the brake signal $S_B$ to produce a HIGH-level flip-flop signal. On the other hand, the flip-flop 520 is reset in response to the trailing edge on the HIGH level accelerator signal $S_I$ to change its output signal level from HIGH to LOW. Therefore, the flip-flop 520 remains SET as long as the accelerator signal $S_T$ remains HIGH once it is set by the brake signal. The output signal of the flip-flop 520 is fed to the drive signal generator 90 to cause down-shifting by energizing the down-shifting actuator 92 of the automatic transmission for as long as the flip-flop remains SET. The Q-output terminal of the flip-flop 520 is also connected to the deceleration signal generator 70 which has substantially the same circuitry as shown in FIG. 3.

According to this modification, once the brake is applied to set the flip-flop 520 and thus cause the down shifting of the automatic transmission gear, the flip-flop 520 remains SET until the accelerator pedal is depressed and thus it is reset. Therefore, once the brake pedal is depressed, the transmission if remains in its down-shifted gear even if the brake pedal is released.

Figure 6:
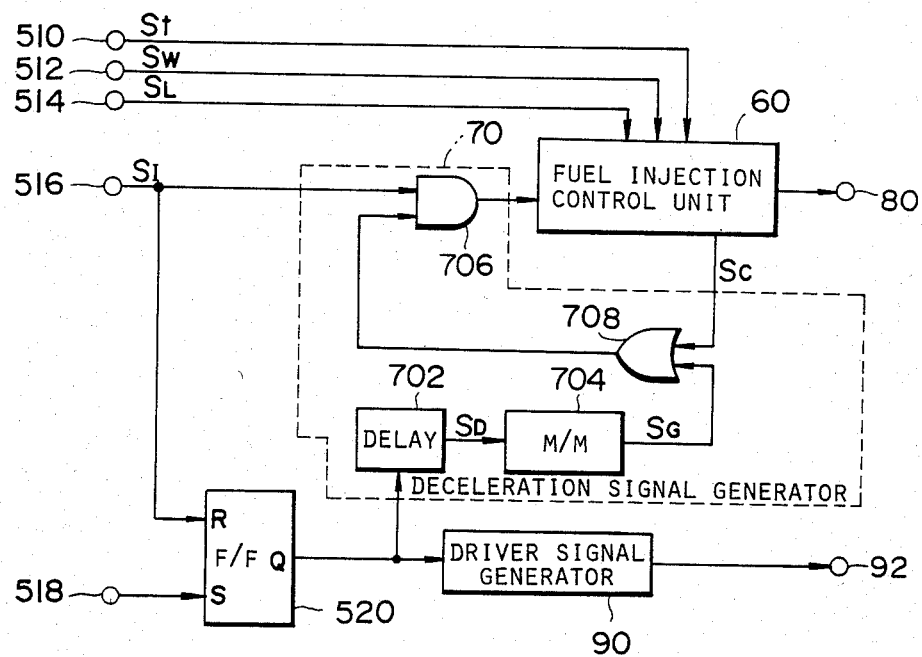
FIG. 6 is a schematic block diagram of the fifth embodiment of the fuel cut-off control system.

FIG. 6 shows another modification of the fuel cut-off control system of FIG. 3. In this modification, the flip-flop 520 is inserted between the brake sensor 518, the accelerator pedal sensor 516 and the drive signal generator 90 and the delay circuit 702 of the deceleration signal generator 70, similarly to the foregoing first modification shown in FIG. 5. The monostable multivibrator 704 is connected to the AND gate 706 via an OR gate 708. To the OR gate 708, the fuel cut-off signal generator in the fuel injection control unit 60 is also connected to supply the fuel cut-off signal $S_C$.

In this construction, even when the brake is applied and thereby the output level of the monostable multivibrator 704 changes from HIGH level to LOW level, the AND gate 706 receives a HIGH-level input from the OR gate so that it will continue to output a HIGH-level signal as long as the engine speed remains above the fuel recovery threshold and thus the fuel cut-off signal is produced. As a result, the fuel supply will not resume in response to application of the brake while the engine speed is above the fuel recovery threshold, so that the fuel cut-off period is prolonged.

When the engine speed drops to a level equal to or below the fuel recovery threshold, the fuel cut-off signal goes LOW. At this time, the fuel cut-off signal generator switches the reference signal from the fuel recovery reference signal $N_f$ to the fuel cut-off reference signal $N_C$. While the fuel cut-off signal $S_C$ remains LOW and the monostable multivibrator 704 produces a LOW-level signal $S_M$, the AND gate 706 outputs a LOW-level signal $S_G$. As a result, the fuel cut-off signal generator stops outputting the fuel cut-off signal $S_C$ in order to resume fuel supply to the engine and switches the reference signal from the fuel cut-off reference signal $N_C$ to the fuel recovery reference signal $N_f$.

Figure 7:
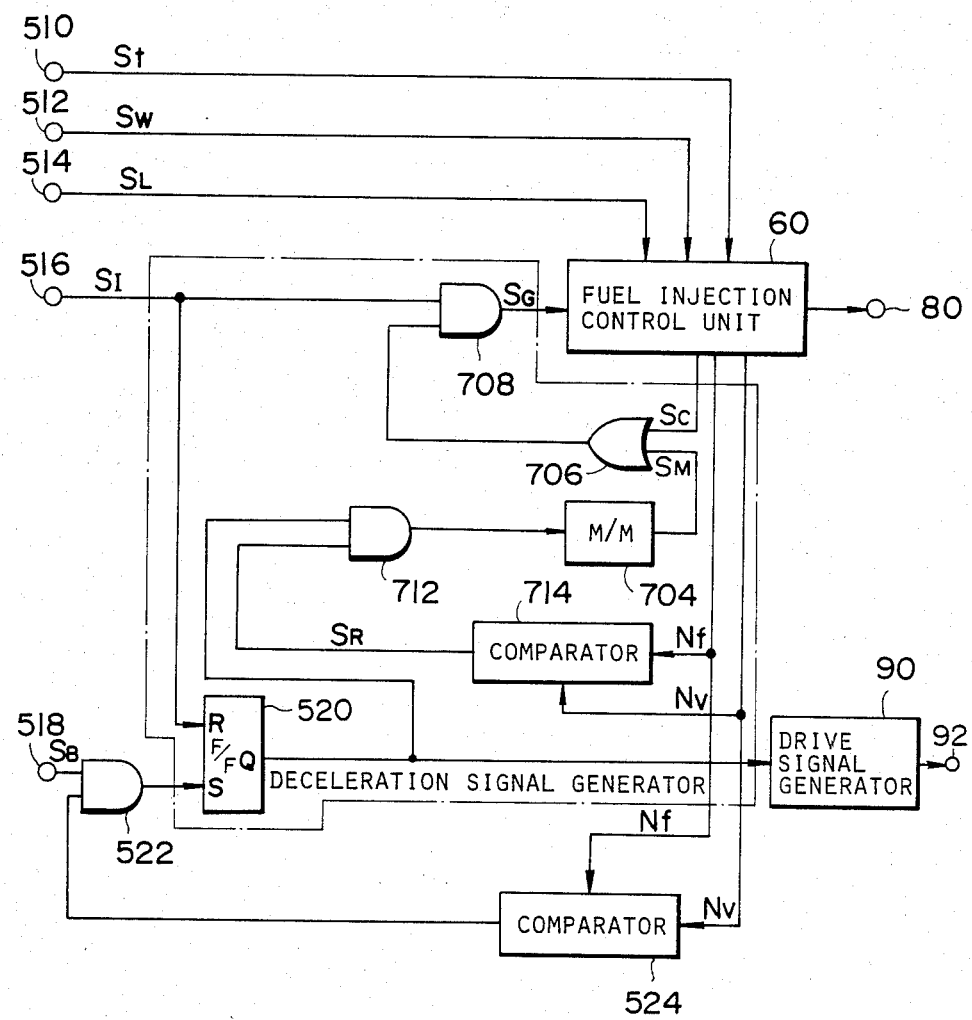
FIG. 7 is a schematic block diagram of the sixth embodiment of the fuel cut-off control system.

FIG. 7 shows another modification of the fuel cut-off control system of FIG. 3. In this modification, the brake sensor 518 is connected to one of the input terminals of an AND gate 522, the output terminal of which is, in turn, connected to the SET input terminal S of the flip-flop 520. The other input terminal of the AND gate is connected to the output terminal of a comparator 524 which receives as inputs the frequency/voltage converter output $N_v$ representative of the engine speed and a fuel recovery reference signal $N_f$. The comparator 524 is adapted to produce a HIGH level comparator signal as long as the frequency/voltage converter output $N_v$ is greater than the fuel recovery reference signal value $N_f$. Therefore, the flip-flop 520 is set in response to the brake signal $S_B$ only when the HIGH level comparator signal is present. The Q-output terminal of the flip-flop 520 is connected to one of the input terminal of an AND gate 712, the other input terminal of which is, in turn, connected to a comparator 714. Similar to the comparator 524, the comparator 714 receives the frequency/voltage converter output value $N_v$ and the fuel recovery reference signal value $N_f$ and produces a HIGH level comparator signal when the value $N_v$ is greater than the value $N_f$. The AND gate 712 outputs a HIGH-level signal in response to the HIGH level flip-flop signal from the flip-flop 520 and the HIGH-level comparator signal. The HIGH-level AND-gate output thus produced is supplied to the monostable multivibrator 704. The monostable multivibrator 704 has the same function as set forth with respect to the second embodiment of FIG. 3, i.e., the output level of the monostable multivibrator 704 is responsive to the HIGH level AND-gate signal to change from HIGH level to LOW level. The LOW level signal $S_M$ from the monostable multivibrator 704 is applied to the AND gate 706 via the OR gate 708. The other input terminal of the OR gate 708 is connected to the fuel cut-off signal generator in the fuel injection control unit 60. Therefore, the output of the OR gate 708 goes LOW when the fuel cut-off signal is not outputted and the monostable multivibrator 704 outputs a LOW-level signal $S_M$. In other words, the AND gate 706 is closed when fuel supply is resumed after the engine speed has dropped below the fuel recovery reference speed and the brake is applied.

According to this embodiment, the drive signal generator 90 produces the drive signal to cause down-shifting of the transmission gear position in response to application of the brake while the engine speed exceeds the fuel recovery speed. In response to down-shifting of the transmission gear, the engine speed is increased to prolong the period in which the engine speed remains above the fuel recovery engine speed.

Figure 8:
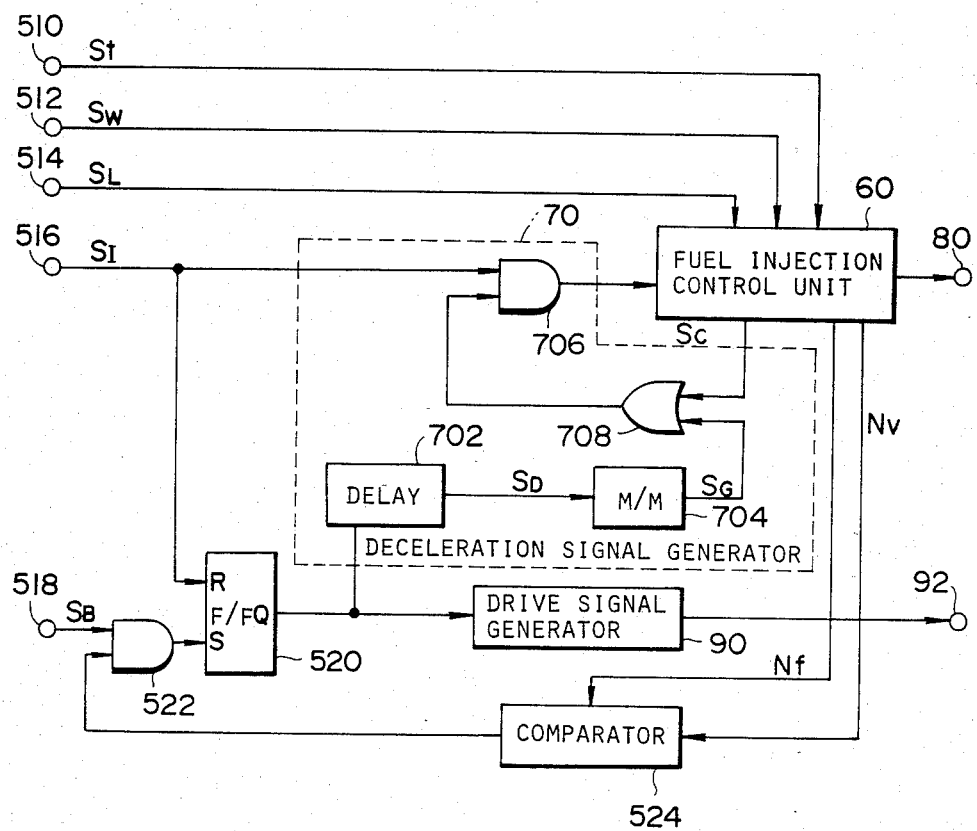
FIG. 8 is a schematic block diagram of the seventh embodiment of the fuel cut-off control system.

FIG. 8 shows yet another modification of the second embodiment of FIG. 3. In this modification, the flip-flop 520 is connected to the monostable multivibrator 704 via the delay circuit 702 instead of the AND gate 712 in the embodiment of FIG. 7. Since the flip-flop 520 is set in response to a HIGH-level signal of the AND gate 522 which is outputted when the comparator signal and the brake signal are both HIGH, the deceleration signal generator 70 will function similarly to the foregoing FIG. 7 except for the additional delay in the change of the output signal level of the AND gate 706 from HIGH level to LOW level.

Therefore, substantially the same effect can be obtained as in the foregoing modification of FIG. 7. In addition, according to the present invention, by providing the additional delay, the timing of switching the reference signal from the fuel cut-off reference signal to the fuel recovery reference signal will match the timing of the down shifting of the transmission gear including the response lag of the hydraulic circuit.

While the present invention has been illustrated in detail with respect to the specific embodiments, the invention can be embodied otherwise and embodied in many ways without departing from the principle of the invention. Therefore, the present invention should be understood to include all of the possible modifications and embodiments which employ the gist of the invention.

What is claimed is:

1. A fuel cut-off control system for a fuel injection internal combustion engine comprising:
    a first means for detecting a released position of an accelerator pedal to produce a first signal;
    a second means for deriving the revolution speed of the engine to produce a second signal having a value indicative of said engine revolution speed;
    a third means for detecting application of a brake to produce a third signal;
    a fuel injection system for controlling fuel injection quantity and fuel injection timing;
    fuel cut-off signal generator for producing a fuel cut signal to disable said fuel injection system to cut-off fuel supply to the engine in response to said first signal and including means for selectively comparing said second signal value with a first lower and a second higher threshold values, said fuel cut-off signal generator being operable in either one of a first state in which said comparing means is activated to compare said second signal value with said first, lower threshold value to resume operation of said fuel injection system to resume fuel supply to the engine when said second signal value becomes lower than said first threshold value, a second state in which said comparing means is activated to compare said second signal value with said second, higher threshold value to disable said fuel injection system when said second signal value exceeds said second threshold value, and a third state in which said comparing means is activated to compare said second signal value with said first threshold value to disable said fuel injection system when said second signal value exceeds said first threshold value; and
    means for operating said fuel cut-off signal generator in said third state in response to said third signal.

2. A fuel cut-off control system for a fuel injection internal combustion engine comprising:
    a first means for detecting a released position of an accelerator pedal to produce a first signal;
    a second means for deriving engine revolution speed to produce a second signal having a value indicative of said engine revolution speed;
    a third means for detecting application of a brake to produce a third signal;
    a fuel injection system for injecting fuel into the engine;
    a fuel cut-off signal generator for producing a fuel cut signal to disable said fuel injection system to cut-off fuel supply to the engine in response to said first signal, said fuel cut-off signal generator including means for comparing said second signal value with predetermined thresholds, said generator being variable between a first state in which said second signal value is compared to a first, lower threshold to resume operation of said fuel injection system when said second signal value becomes equal to or less than said first threshold, a second state in which said second signal value is compared to a second, higher threshold to disable said fuel injection system when said second signal value becomes equal to or greater than said second threshold, and a third state in which said second signal value is compared with said first threshold to disable said fuel injection system when said second signal value exceeds said first threshold value; and means for setting said fuel cut-off signal generator to said third state in response to said third signal.

3. A fuel cut-off control system for a fuel injection internal combustion engine comprising:

a first means for detecting a released position of an accelerator pedal to produce a first signal;

a second means for deriving engine revolution speed to produce a second signal having a value indicative of the engine revolution speed;

a third means for detecting application of a brake to produce a third signal;

a fourth means for detecting the load condition on the engine to produce a fourth signal having a value indicative of the engine load condition;

a fuel injection system for injecting fuel at a controlled amount and a controlled timing based on said second and fourth signal values;

a fuel cut-off signal generator for producing a fuel cut signal to disable said fuel injection system to cut-off fuel supply to the engine in response to said first signal, said fuel cut-off signal generator including means for comparing said second signal value with predetermined thresholds, said generator being variable between a first state in which said second signal value is compared to a first, lower threshold to resume operation of said fuel injection system when said second signal value becomes equal to or less than said first threshold, a second state in which said second signal value is compared to a second, higher threshold to disable said fuel injection system when said second signal value becomes equal to or greater than said second threshold, and a third state in which said second signal value is compared with said first threshold to disable said fuel injection system when said second signal value exceeds said first threshold value; and means for setting said fuel cut-off signal generator to said third state in response to said third signal.

4. A fuel cut-off control system for a fuel injection internal combustion engine comprising:

a first means for detecting a released position of an accelerator pedal to produce a first signal;

a second means for deriving engine revolution speed to produce a second signal having a value indicative of the engine revolution speed;

a third means for detecting application of a brake to produce a third signal;

a fourth means for detecting the load condition on the engine to produce a fourth signal having a value indicative of the engine load condition;

a fuel injection system for injecting fuel at a controlled amount based on said second and fourth signal values, and in synchronism with the engine revolution;

a fuel cut-off signal generator for producing a fuel cut signal to disable said fuel injection system to cut-off fuel supply to the engine in response to said first signal, said fuel cut-off signal generator including means for comparing said second signal value with thresholds, said generator being variable between a first state in which said second signal value is compared to a first, lower threshold to resume operation of said fuel injection system when said second signal value becomes equal to or less than said first threshold, a second state in which said second signal value is compared to a second, higher threshold to disable said fuel injection system when said second signal value becomes equal to or greater than said second threshold, and a third state in which said second signal value is compared with said first threshold to disable said fuel injection system when said second signal value exceeds said first threshold value; and means for receiving said third signal and responsive thereto for setting said fuel cut-off signal generator to said third state after a predetermined period of time after receiving said third signal.

5. A fuel cut-off control system for a fuel injection internal combustion engine comprising:

a first means for detecting a released position of an accelerator pedal to produce a first signal;

a second means for producing a second signal being an engine speed dependent signal having a value variable depending upon the engine revolution speed;

a third means for detecting application of a brake to produce a third signal;

a fourth means for detecting a load condition on the engine to produce a fourth signal having a value indicative of the engine load condition;

a fuel injection system for injecting fuel at a controlled amount and a controlled timing based on said second and fourth signal values;

a fuel cut-off signal generator for producing a fuel cut signal to disable said fuel injection system to cut-off fuel supply to the engine in response to said first signal, said fuel cut-off signal generator including means for comparing said second signal value with predetermined thresholds, said generator being variable between a first state in which said second signal value is compared to a first, lower threshold to resume operation of said fuel injection system when said second signal value becomes equal to or less than said first threshold, a second state in which said second signal value is compared to a second, higher threshold to disable said fuel injection system when said second signal value becomes equal to or greater than said second threshold, and a third state in which said second signal value is compared with said first threshold to disable said fuel injection system when said second signal value exceeds said first threshold value;

means for setting said fuel cut-off signal generator to said third state in response to said third signal; and an automative power transmission including a downshifting means which shifts the transmission down to a lower gear in response to said third signal.

6. A fuel cut-off control system for a fuel injection internal combustion engine comprising:
- a first means for detecting a released position of an acceleration pedal to produce a first signal;
- a second means for producing a second signal being an engine speed dependent signal having a value variable depending upon the engine revolution speed;
- a third means for detecting application of a brake to produce a third signal;
- a fourth means for detecting a load condition of the engine to produce a fourth signal having a value indicative of the engine load condition;
- a fuel injection system for injecting fuel at a controlled amount based on said second and fourth signal values and synchronously with the engine revolution;
- a fuel cut-off signal generator for producing a fuel cut signal to disable said fuel injection system to cut-off fuel supply to the engine in response to said first signal, said fuel cut-off signal generator including means for comparing said second signal value with predetermined thresholds, said generator being variable between a first state in which said signal value is compared to a first, lower threshold to resume operation of said fuel injection system when said second signal value becomes equal to or less than said first threshold, a second state in which said second signal value is compared to a second, higher threshold to disable said fuel injection system when said second signal value becomes equal to or greater than said second threshold, and a third state in which said second signal value is compared with said first threshold to disable said fuel injection system when said second signal value exceeds said first threshold value;
- means for receiving said third signal and responsive thereto for setting said fuel cut-off signal generator to said third state after a predetermined period of time after receiving said third signal; and
- an automatic power transmission including a down-shifting means responsive to said third signal to shift the transmission to a lower gear ratio.

7. A fuel cut-off control system for a fuel injection internal combustion engine comprising:
- a first means for detecting a released position of an acceleration pedal to produce a first signal;
- a second means for producing a second signal being an engine speed dependent signal having a value variable depending upon the engine revolution speed;
- a third means for detecting application of a brake to produce a third signal;
- a fourth means for detecting a load condition on the engine to produce a fourth signal having a value indicative of the engine load condition;
- a fuel injection system for injecting fuel at a controlled amount based on said second and fourth signal values and in synchronism with the engine revolution;
- a fuel cut-off signal generator for producing a fuel cut signal to disable said fuel injection system to cut-off fuel supply to the engine in response to said first signal, said fuel cut-off signal generator including means for comparing said second signal value with predetermined thresholds, said generator being variable between a first state in which said second signal value is compared to a first, lower threshold to resume operation of said fuel injection system when said second signal value becomes equal to or less than said first threshold, a second state in which said second signal value is compared to a second, higher threshold to disable said fuel injection system when said second signal value becomes equal to or greater than said second threshold, and a third state in which said second signal value is compared with said first threshold to disable said fuel injection system when said second signal value exceeds said first threshold value;
- means for receiving said third signal and responsive thereto for setting said fuel cut-off signal generator to said third state after a predetermined period of time after receiving said third signal;
- an automatic power transmission; and
- down-shifting means, incorporated in said automatic power transmission, for shifting the transmission to a lower gear ratio in response to said third signal.

8. The system as set forth any one of claims 2 to 7, wherein said setting means is associated with said first means to interrupt said first signal for a given period of time in response to said third signal.

9. The system as set forth in claim 8, which further comprises a holding circuit for holding said third signal to maintain said third signal even when said third means cease to produce said third signal.

10. The system as set forth in claim 9, wherein said third signal holding circuit is responsive to the trailing edge of said first signal to cease output of the third signal.

11. The system as set forth in claim 8, which includes a delay circuit interpositioned between said third means and said fuel cut-off signal generator for providing a delay in the operation of said setting means.

12. The system as set forth in claim 11, which further comprises an engine coolant temperature sensor for detecting the temperature of an engine coolant to produce an engine coolant temperature signal having a value proportional to said engine coolant temperature, and said first and second thresholds are adjusted to accordance with said engine coolant temperature signal value.

13. The system as set forth in claim 5, 6 or 7, further comprising a comparator for comparing said second signal value and said first threshold, and disabling the down-shifting operation of said down-shifting means when said second signal value is less than said first threshold.

14. The system as set forth in claim 5, 6 or 7, wherein said down-shifting means is connected to said means for setting said fuel cut-off signal generator such that said setting means becomes operative in response to said third signal with a given delay time after operation of said down-shifting means.

15. The system as set forth in claim 13, which further comprises an engine coolant temperature sensor for detecting the temperature of the engine coolant to produce an engine coolant temperature signal having a value proportional to said engine coolant temperature, and said first and second thresholds are adjusted in accordance with said engine coolant temperature signal value.

16. In a fuel injection control system for detecting control parameters and producing a fuel injection pulse with a duty cycle corresponding to a determined fuel injection amount and outputting said fuel injection pulse in synchronism with the engine revolution, a method for controlling fuel cut-off comprising:
detecting whether a throttle valve angular position is smaller than a predetermined open angle and producing a first signal in response thereto;
producing an engine speed dependent signal having a value variable depending upon the engine revolution speed;
deriving engine revolution speed on the basis of said engine speed dependent signal value and producing a second signal having a value indicative of the engine revolution speed;
detecting initial application of a brake and producing a third signal in response thereto;
producing first, lower and second, higher reference signals respectively having values representative of first, lower and second, upper thresholds;
producing a fuel cut-off signal which cuts off fuel supply in response to said first signal;
comparing said second signal value with said first reference signal value in the presence of the fuel cut-off signal and ceasing production of the fuel cut-off signal in order to resume fuel supply when said second signal value becomes less than said first reference signal value;
comparing said second signal value with said second reference signal value in the absence of the fuel cut-off signal and producing the fuel cut-off signal when said second signal value exceeds said second reference signal value; and
comparing said second signal value with said first reference signal in the absence of the fuel cut-off signal and the presence of the third signal and producing the fuel cut-off signal in response to said third signal when said second signal value exceeds said first reference signal value.

17. In a fuel injection control system for detecting control parameters and producing a fuel injection pulse with a duty cycle corresponding to a determined fuel injection amount and outputting said fuel injection pulse in synchronism with the engine revolution,
a method for controlling fuel cut-off comprising:
detecting whether a throttle valve angular position is smaller than a predetermined open angle and producing a first signal in response thereto;
producing an engine speed dependent signal having a value variable depending upon the engine revolution speed;
deriving engine revolution speed on the basis of said engine speed dependent signal value and producing a second signal having a value indicative of the engine revolution speed;
detecting initial application of brake to produce a third signal;
interrupting said first signal for a given period of time in response to said third signal;
producing first, lower and second, higher reference signal respectively having values representative of first, lower and second, upper thresholds;
producing a fuel cut-off signal to cut-off fuel supply as long as said first signal is present and said second signal value is above said first reference signal value;
comparing said second signal value with said first reference signal value in the presence of said fuel cut-off signal and ceasing production of said fuel cut-off signal when said second signal value becomes less than said first reference signal value;
comparing said second signal value with said second reference signal value in the absence of said fuel cut-off signal and producing said fuel cut-off signal when said second signal value exceeds said second reference signal value; and
comparing said second signal value with said first reference signal value in the absence of the fuel cut-off signal and the presence of the third signal and producing the fuel cut-off signal in response to said third signal when said second signal value exceeds said first reference signal value.

18. In a fuel injection control system for detecting control parameters and producing a fuel injection pulse with a duty cycle corresponding to a determined fuel injection amount and outputting said fuel injection pulse synchronously with the engine revolution,
a method for controlling fuel cut-off comprising:
detecting whether a throttle valve angular position is smaller than a predetermined open angle and producing a first signal in response thereto;
producing an engine speed dependent signal having a value variable depending upon the engine revolution speed;
deriving engine revolution speed on the basis of said engine speed dependent signal value and producing a second signal having a value indicative of the engine revolution speed;
detecting initial application of a brake to produce a third signal;
producing first, lower and second, higher reference signals respectively having values representative of first, lower and second, upper thresholds;
producing a fuel cut-off signal to cut-off fuel supply in response to said first signal;
comparing said second signal value with said first reference signal value in the presence of said fuel cut-off signal and ceasing to produce said fuel cut-off signal when said second signal value becomes less than said first reference signal value;
comparing said second signal value with said second reference signal value in the absence of said fuel cut-off signal and producing said fuel cut-off signal when said second signal value exceeds said second reference signal value;
comparing said second signal value with said first reference signal value in the absence of said fuel cut-off signal and in the presence of said third signal and producing said fuel cut-off signal in response to said third signal when said second signal value exceeds said first reference signal value; and
shifting an automatic power transmission to a lower gear ratio in response to said third signal.

19. In a fuel injection control system for detecting control parameters and producing a fuel injection pulse with a duty cycle corresponding to a determined fuel injection amount and outputting said fuel injection pulse in synchronism with the engine revolution,
a method for controlling fuel cut-off comprising:
detecting whether a throttle valve angular position is smaller than a predetermined open angle and producing a first signal in response thereto;
producing an engine speed dependent signal having a value variable depending upon the engine revolution speed;
deriving engine revolution speed on the basis of said engine speed dependent signal value and producing a second signal having a value indicative of the engine revolution speed;

detecting initial application of a brake and producing a third signal in response thereto;

interrupting said first signal for a given period of time in response to said third signal;

producing first, lower and second, higher reference signals respectively having values representative of first, lower and second, upper thresholds;

producing a fuel cut-off signal to cut-off fuel supply as long as said first signal is present and said second signal value exceeds said first reference signal value;

comparing said second signal value with said first reference signal value in the presence of said fuel cut-off state and ceasing production of said fuel cut-off signal when said second signal value becomes less than said first reference signal value;

comparing said second signal value with said second reference signal value in the absence of said fuel cut-off signal and producing said fuel cut-off signal when said second signal value exceeds said second reference signal value;

comparing said second signal value with said first reference signal value in the absence of the fuel cut-off signal in response to said third signal when said second signal value exceeds said first reference signal value; and shifting an automatic power transmission to a lower gear ratio in response to said third signal.

20. The method as set forth in any one of claims 16 to 19, wherein said third signal is maintained even when the brake is released, as long as engine deceleration continues.

21. The method as set forth in claim 16 or 18, which further comprises the step of comparing said second signal value with said first reference signal value to produce an enabling signal for enabling said step of comparing in the presence of said third signal when said second signal value exceeds said first reference signal value.

22. The method as set forth in claim 17 or 19, which further comprises the step of comparing said second signal value with said first reference signal value to produce an enabling signal for enabling said interruption of said first signal when said second signal value exceeds said first reference signal value.

23. The method as set forth in claim 21, wherein said step of comparing in the presence of said third signal is performed after a given delay time after production of said third signal.

24. The method as set forth in claim 22, wherein said interruption of said first signal in response to said third signal is performed after a given delay time after production of said third signal.

25. The method as set forth in any one of claims 16 to 19, which further comprises the step of detecting engine coolant temperature to produce an engine coolant temperature signal having a value proportional to said engine coolant temperature, and said first and second reference signal values are adjusted in accordance with said engine coolant temperature signal value.

26. A fuel cut-off control method for an internal combustion engine in an automotive vehicle with a fuel injection system which performs fuel injection into the engine and which ceases to perform fuel injection in the presence of a fuel cut-off signal $S_C$, the method comprising the steps of:

(a) deriving the revolution speed of the engine;

(b) producing a deceleration signal when engine operating conditions are conducive to engine braking;

(c) comparing the measured engine speed to a first threshold speed;

(d) producing the fuel cut-off signal when the measured engine speed is below the first threshold speed and the deceleration signal is produced;

(e) comparing the measured engine speed to a second threshold speed lower than the first threshold speed;

(f) preventing production of the deceleration signal, so as to allow the fuel injection system to resume fuel injection, when the measured engine speed is below the second threshold speed;

the step of producing the deceleration signal comprising the steps of monitoring the state of engine load and vehicle braking and producing the deceleration signal when the vehicle is in a substantially no engine load state and no vehicle braking state.

27. The fuel cut-off control method of claim 26, wherein the engine is equipped with an automatic power transmission and further comprising the step of shifting the automatic transmission into the next lower gear when the vehicle operator requests vehicle braking.

28. The fuel cut-off control method of either of claims 26 or 27, further comprising the steps of measuring engine temperature and adjusting the first and second threshold speeds in accordance with the measured engine temperature.

29. The fuel cut-off control method of either of claims 26 or 27, further comprising the step of producing the deceleration signal $S_G$ within a predetermined period of time after the vehicle operator requests vehicle braking when the vehicle operator requests substantially no engine load.

30. The fuel cut-off control method of either of claims 26 or 27, wherein after the deceleration signal $S_G$ has been initially produced, the deceleration signal $S_G$ is continuously produced as long as the vehicle operator requests substantially no engine load.

31. The fuel cut-off method of either of claims 26 or 27, wherein said step of monitoring engine load requested by the vehicle operator comprises the step of detecting the position of an accelerator pedal of the engine and recognizing that the vehicle operator requests substantially no engine load when the accelerator pedal is in a released position.

32. The fuel cut-off method of either of claims 26 or 27, wherein said step of monitoring engine load requested by the vehicle operator comprises the step of detecting the position of a throttle valve of the engine and recognizing that the vehicle operator requests substantially no engine load when the throttle valve is substantially closed.

33. A fuel cut-off control system for an internal combustion engine in an automotive vehicle equipped with automatic power transmission and a fuel injection system, which can be selectably disabled by a fuel cut-off signal, the system comprising:

(a) a first sensor producing an engine speed related signal having value variable depending upon engine speed and deriving engine revolution speed on the basis of said engine speed related signal values for outputting an engine speed signal indicative thereof;

(b) a brake sensor for monitoring the vehicle brake system and outputting a brake signal when the vehicle brakes are actuated by the vehicle operator;
(c) an accelerator pedal switch associated with an accelerator pedal of the vehicle for outputting a coasting signal when the accelerator pedal is in a released position corresponding to substantially no load demand on the engine;
(d) a deceleration signal generator responsive to the coasting signal, and said deceleration signal generator being responsive to the brake signal for outputting a deceleration signal irrespective of the coasting signal;
(e) a fuel cut-off means responsive to the engine speed signal and the deceleration signal for starting to output the fuel cut-off signal when the engine speed signal level exceeds a first threshold level and the deceleration is present and continuing to output the fuel cut-off signal as long as the deceleration signal is present and the engine speed signal level exceeds a second threshold level representing a lower engine speed than the first threshold level.

34. The system of claim 33, further comprising an engine temperature sensor for outputting a temperature signal $S_w$ indicative of engine temperature, and means responsive to the temperature signal for adjusting the first and second threshold levels in accordance with engine temperature as indicated by the temperature signal.

35. The system of claim 34, further comprising means responsive to the brake signal for shifting the automatic transmission into the next lower gear.

36. The system of claim 34, further comprising means for delaying the output of the brake signal by a predetermined period of time.

37. The system of claim 35, further comprising means for delaying the output of the brake signal for a period of time approximating the response time of said shifting means.

38. The system of any one of claims 33 to 37, wherein the deceleration signal generator comprises in part an R-S-type flip-flop circuit, the set input terminal of which receives the brake signal and the reset input terminal of which receives the coasting signal, a monostable multivibrator responsive to the change from low level to high level of the output of Q-output terminal of said flip-flop to output a low-level signal for a predetermined period of time, and an AND gate receiving as inputs the coasting signal and the output of said multivibrator, the deceleration signal being derived from the output terminal of said AND gate.

39. The system of claim 38, wherein the deceleration signal generator further comprises an OR gate receiving as inputs the output of said multivibrator and the fuel cut-off signal and the output of which is inputted to said AND gate.

* * * * *